(12) United States Patent
Gupta

(10) Patent No.: US 9,158,498 B2
(45) Date of Patent: Oct. 13, 2015

(54) OPTIMIZING FIXED POINT DIVIDE

(71) Applicant: INTEL CORPORATION, Santa Clara, CA (US)

(72) Inventor: Niraj Gupta, Bangalore (IN)

(73) Assignee: INTEL CORPORATION, Santa Clara, CA (US)

(*) Notice: Subject to any disclaimer, the term of this patent is extended or adjusted under 35 U.S.C. 154(b) by 193 days.

(21) Appl. No.: 13/759,274

(22) Filed: Feb. 5, 2013

(65) Prior Publication Data

US 2014/0222884 A1 Aug. 7, 2014

(51) Int. Cl.
*G06F 7/52* (2006.01)
*G06F 7/535* (2006.01)

(52) U.S. Cl.
CPC ........ *G06F 7/535* (2013.01); *G06F 2207/5354* (2013.01); *G06F 2207/5356* (2013.01)

(58) Field of Classification Search
None
See application file for complete search history.

(56) References Cited

U.S. PATENT DOCUMENTS

| 6,351,760 | B1* | 2/2002 | Shankar et al. ............... 708/654 |
| 8,429,217 | B2 | 4/2013 | Schmookler |
| 2001/0022859 | A1* | 9/2001 | Okabayashi et al. ......... 382/278 |
| 2004/0158595 | A1* | 8/2004 | Cheung et al. ............... 708/490 |
| 2009/0319589 | A1 | 12/2009 | Kluver et al. |

* cited by examiner

*Primary Examiner* — Michael D Yaary
(74) *Attorney, Agent, or Firm* — Lynch Law Patent Group, P.C.

(57) ABSTRACT

Systems, apparatus and methods are described related to optimizing fixed point divide.

24 Claims, 7 Drawing Sheets

300

RECEIVE A FIXED POINT NUMERATOR AND A FIXED POINT DENOMINATOR GREATER THAN THE FIXED POINT NUMERATOR
302

DETECT A LEADING NUMBER OF ZEROS IN THE FIXED POINT DENOMINATOR TO DETERMINE A SHIFT VALUE
304

SHIFT THE FIXED POINT DENOMINATOR BY THE SHIFT VALUE TO DETERMINE A SHIFTED DENOMINATOR
306

SHIFT THE FIXED POINT NUMERATOR BY THE SHIFT VALUE TO DETERMINE A SHIFTED NUMERATOR
308

DETERMINE A FIXED POINT INVERSE DENOMINATOR ASSOCIATED WITH THE SHIFTED DENOMINATOR
310

PERFORM A MULTIPLICATION OF THE FIXED POINT INVERSE DENOMINATOR AND THE SHIFTED NUMERATOR TO DETERMINE A FIXED POINT DIVIDE RESULT
312

FIG. 3

OPTIMIZING FIXED POINT DIVIDE

BACKGROUND

In computing environments, a fixed point number may represent a real number. The fixed point number may include a fixed number of digits after the decimal point and/or before the decimal point. Commonly, in computing environments, the fixed point numbers are binary fixed point numbers. In fixed point divide (i.e., the division of fixed point numbers), a fixed point denominator may be inspected to determine a leading number of zeros (i.e., any zeros that lead a number string in the positional notation of the fixed point number) in the fixed point denominator. The denominator may then be shifted left by the number of zeros to generate a shifted denominator. The shifted denominator or the most significant portion of the shifted denominator may be used, via a lookup table for example, to determine a shifted denominator inverse (i.e., an inverse associated with the shifted denominator). As will be appreciated, the shifted denominator inverse may be an approximation of the actual inverse of the shifted denominator.

The shifted denominator inverse may then be multiplied by a fixed point numerator to determine a temporary result. The temporary result may be shifted right to form a divide result, which may be clamped and used for a variety of purposes. For example, in graphics processing, fixed point divide may be an important feature of a graphics processing unit. The fixed point divide may be called upon in a variety of circumstances such as image manipulation, interpolation, or the like. As will be appreciated, in the described implementation, a number of transistor gates (and associated silicon surface area) must be utilized for the multiplication of the shifted denominator inverse and the fixed point numerator. In general, it may be advantageous to reduce the number of gates and associated silicon surface area. Further, it may be advantageous to increase the precision of the fixed point divide.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 3 is a flow chart illustrating an example process for dividing fixed point numbers;

DETAILED DESCRIPTION

Figure 1:
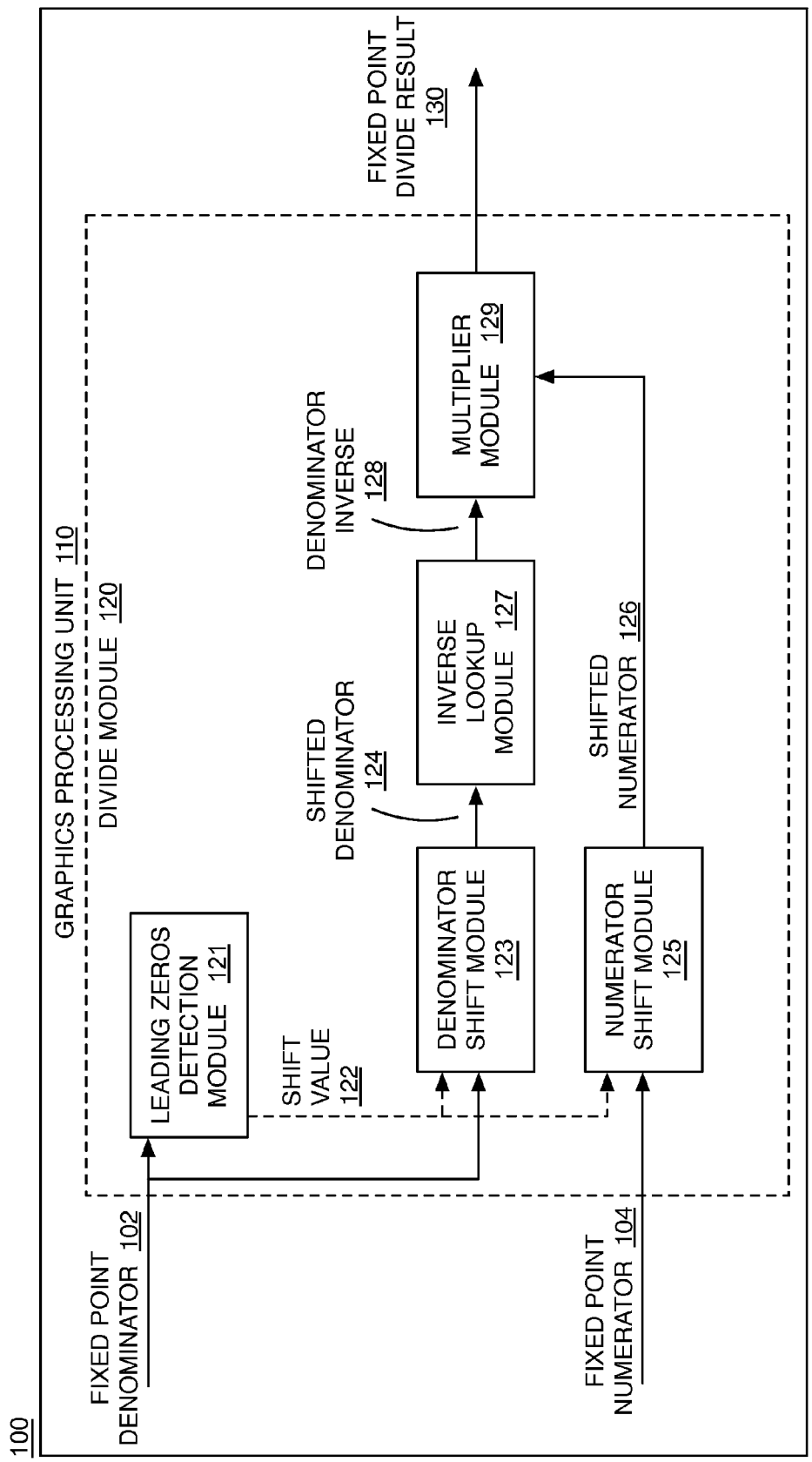
FIG. 1 is an illustrative diagram of an example system for dividing fixed point numbers.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to effect such feature, structure, or characteristic in connection with other implementations whether or not explicitly described herein.

Systems, apparatus, articles, and methods are described below related to optimizing fixed point divide.

As described above, in a fixed point divide, a fixed point numerator may be divided by a fixed point denominator to generate a divide result. In some current techniques, the fixed point denominator may be inspected to determine a leading number of zeros in the fixed point denominator and the denominator may then be shifted left by that number of zeros to generate a shifted denominator. The shifted denominator or the most significant portion of the shifted denominator may be used, via a lookup table, to determine a shifted denominator inverse which may be multiplied by a fixed point numerator to determine a temporary result. The temporary result may be shifted by the number of zeros to form a divide result, which may be clamped and used for a variety of purposes. In general, such techniques may provide for fixed point divide result regardless of the relationship between the denominator and the numerator (i.e., which of the denominator or numerator is greater).

As is described further below, in examples where the denominator is greater than the numerator, techniques discussed herein may provide for implementations where fewer transistor gates (and, relatedly, a lower silicon surface area) may be used and where greater precision may be provided in the divide result. For example, when the denominator is greater than the numerator, a leading number of zeros may be determined for the fixed point denominator to determine a shift value. The denominator may be shifted (e.g., to remove the leading zeros) by the shift value to generate a shifted denominator. The shifted denominator or the most significant portion of the shifted denominator may be used, via a lookup table, to determine a shifted denominator inverse (i.e., an inverse associated with the shifted denominator). In some examples, the shifted denominator inverse may be optimized based on a desired precision. Further, and in contrast to prior techniques, the numerator may be shifted (e.g., to remove the leading zeros) by the shift value to generate a shifted numerator. The shifted denominator inverse and shifted numerator may be multiplied to determine a divide result. As will be appreciated, further techniques (e.g., determining absolute value operations on the fixed point numerator and/or denominator, and operations associated with determining whether the fixed point divide result is positive or negative) may also be utilized. Using the techniques discussed herein, the multiplication step may require fewer transistor gates (and associated silicon area) since both the numerator and the denominator are shifted. Further, the described techniques may also provide greater precision in the divide result.

FIG. 1 is an illustrative diagram of an example system 100 for dividing fixed point numbers, arranged in accordance with at least some implementations of the present disclosure. As shown, system 100 may include a graphics processing unit 110 having a divide module 120. Divide module 120 may receive fixed point denominator 102 and fixed point numerator 104 and generate fixed point divide result 130. In general, a fixed point number may be a real data type or structure used to describe or approximate a real number in a computing environment. For example, a fixed point number may be a binary number having a fixed number of digits after a decimal point (or radix point). In some examples, a fixed point number may also have a fixed number of digits before the decimal point. In any event, such fixed point numbers may be stored in memory, manipulated by hardware, received as input and provided as output, and the like. In some examples, fixed point numerator 102 and/or fixed point denominator 104 may be associated with an input image. The input image may include an image file or a video frame, for example. In various examples, fixed point numerator 102 and/or fixed point denominator 104 may be 8 bits, 16 bits, 24 bits, or 32 bits, or the like. As will be appreciated, the results of arithmetic operations (such as divide operations) on fixed point numbers may be important in computing environments and, in particular, in graphics and image processing implementations. Further, although discussed with respect to image data and the like, the described techniques and implementations may be used in any computing environment that provides for fixed point divide.

As shown in FIG. 1, fixed point denominator 102 and fixed point numerator 104 may be received at divide module 120. In general, fixed point denominator 102 and fixed point numerator 104 may be received at divide module 120 may be any numbers of any value so long as fixed point denominator 102 is greater than fixed point numerator 104. In a variety of computing implementations including, for example, graphics and image processing implementations and algorithms it may be known that a fixed point denominator is greater than a fixed point numerator. In such situations, divide module 120 may provide the advantages of fewer gates and associated silicon surface area and increased precision, as discussed herein.

As discussed, in some computing situations it may be known (or least very highly likely) that a fixed point denominator is greater than a fixed point numerator such that divide module 120 may be called upon at a variety of points in a process. Such processes may be substantially complicated and may call upon divide module 120 (and other arithmetic modules) at various points in processing. In other examples, a determination may be made as to whether a fixed point denominator is greater than a fixed point numerator and, if so, divide module 120 may be utilized. However, as will be appreciated, in some examples, such pre-determination may be time consuming and, in such situations, a general purpose divide module may be used as the gained precision may not be worth the trade off of increased processing duration. Further, and as is discussed with respect to FIG. 2 below, it may be advantageous in some implementations to provide both divide module 120 and a traditional divide module. In such implementations, divide module 120 may be implemented when a fixed point denominator is greater (or highly likely to be greater than) than a fixed point numerator and a traditional divide module may be implemented when a fixed point numerator is greater than a fixed point denominator or in such cases as when the relationship is not known or cannot be reliably predicted.

Further, fixed point denominator 102 and fixed point numerator 104 may be received from any suitable device or module. For example, fixed point denominator 102 and fixed point numerator 104 may be received from another module of graphics processing unit 110 or from a module outside of graphics processing unit 110 such as memory stores or the like. Similarly, fixed point divide result 130 may be provided or transmitted to any suitable device or module such as, for example, another module of graphics processing unit 110 or a module outside of graphics processing unit 110 such as memory stores, or the like.

As shown, fixed point denominator 102 may be received at leading zeros detection module 121. Leading zeros detection module 121 may determine the number of leading zeros (i.e., any zeros that lead a number string in the positional notation) of fixed point denominator 102 to determine a shift value 122. For example, the shift value may equal the number of leading zeros. In some examples, prior to processing at leading zeros detection module 121 a received input fixed point denominator may be pre-processed to generate fixed point denominator 102. Such pre-processing is not shown in FIG. 1 for the sake of clarity of presentation. In various examples, the pre-processing may be performed by divide module 120, another module of graphics processing unit 110, or another unit of system 100.

For example, an input fixed point denominator may be pre-processed by determining a sign and an absolute value of the input fixed point denominator. The absolute value of the input fixed point denominator may be deemed to be fixed point denominator 102, for example. A received input fixed point numerator may be similarly pre-processed to generate fixed point numerator 104. For example, the input fixed point numerator may be pre-processed by determining a sign and an absolute value of the input fixed point numerator and the absolute value of the input fixed point denominator may be deemed to be fixed point denominator 102. An example of such optional pre-processing may be shown as follows at equations (1)-(4):

$$Denom\_abs = ABS(Denom\_input) \quad (1)$$

$$Numer\_abs = ABS(Numerator\_input) \quad (2)$$

$$Denom\_sign = SIGN(Denom\_input) \quad (3)$$

$$Numer\_sign = SIGN(Numerator\_input) \quad (4)$$

where Denom_input may be the input fixed point denominator, Denom_abs may be the absolute value of the input fixed point denominator (and fixed point denominator 102), ABS may be an operation that returns the absolute value of the input number, Numerator_input may be the input fixed point numerator, Numer_abs may be the absolute value of the input fixed point numerator (and fixed point numerator 104), Denom_sign may be the denominator sign (i.e., the sign of the denominator), and Numer_sign may be the numerator sign (i.e., the sign of the numerator), and SIGN may be an operation that returns the sign of the input value.

Continuing the example and notation, an example of the operation of leading zeros detection module 121 may be shown as follows at equation (5):

$$Shift\_value = LZ(Denom\_abs) \quad (5)$$

where Shift_value may be shift value 122 and LZ may be an operation that determines the number of leading zeros of the input value.

As shown in FIG. 1, shift value 122 may be transmitted to a denominator shift module 123 and a numerator shift module 125. Further, denominator shift module 123 may receive fixed point denominator 102 and numerator shift module 125 may receive fixed point numerator 104. Denominator shift module 123 may shift fixed point denominator 102 by shift value 122 to determine shifted denominator 124. Shifting fixed point denominator 102 by shift value 122 may include a bitwise arithmetic shift operation, for example. In some examples, shifting fixed point denominator 102 includes a shift left operation as is shown below. Shifted denominator 124 may be a fixed point number. Similarly, numerator shift module 125 may shift fixed point numerator 104 by shift value 122 to determine shifted numerator 126. Shifting fixed point numerator 104 by shift value 122 may include a bitwise arithmetic shift operation, for example, and shifted numerator 126 may be a fixed point number. In some examples, shifting fixed point numerator 104 includes a shift left operation as is shown below.

Continuing the above example, the operations of denominator shift module 123 and a numerator shift module 125 may be shown as follows at equations (6) and (7):

$$Denum\_shifted = Denom\_abs << Shift\_value \quad (6)$$

$$Numer\_shifted = Numerator\_input << Shift\_value \quad (7)$$

where Denum_shifted may be shifted denominator 124, Numer_shifted may be shifted numerator 126, and A<<B may be an operation that performs a shift left of A by B.

As shown in FIG. 1, shifted denominator 124 may be transmitted to an inverse lookup module 127. Inverse lookup module 127 may determine a denominator inverse 128 associated with shifted denominator 124. For example, denominator inverse 128 may be a fixed point number and may be described as a fixed point denominator inverse. In some examples, inverse lookup module 127 may include or communicate with a lookup table that may include an array of denominator inverses (output) associated with shifted denominators (input). The implementation of lookup table may be optimized to provide a predetermined precision threshold for denominator inverse 128.

Continuing the above example, the operations of inverse lookup module 125 may be shown as follows at equation (8):

$$Inverse\_denom = LUT(Denum\_shifted) \quad (8)$$

where Inverse_denom may be denominator inverse 128 and LUT may be an operation that evaluates a look up table for an output value associated with the input value.

As shown, denominator inverse 128 and shifted numerator 126 may be transmitted to a multiplier module 129. Multiplier module 129 may perform a multiplication of denominator inverse 128 and shifted numerator 126 to provide fixed point divide result 130. As discussed, fixed point divide result 130 may be provided or transmitted to any suitable device or module such as, for example, another module of graphics processing unit 110 or a module outside of graphics processing unit 110 such as memory stores, or the like.

Continuing the above example, the operations of multiplier module 129 may be shown as follows at equation (9):

$$Result\_mul = Inverse\_denom * Numer\_shifted \quad (9)$$

where Result_mul may be fixed point divide result 130 and A*B may be an operation that performs a multiplication of A and B.

In some implementations, fixed point divide result 130 may be post-processed by, for example, changing the sign of the fixed point divide result, as needed, based on the numerator sign and denominator sign. Such processing may produce a signed fixed point divide result. Further post-processing may include clamping the signed fixed point divide result and/or transmitting the result to another module or unit, for example. Again continuing the above example, post-processing operations may be shown at equations (10)-(12) as follows:

$$Result\_temp = (Denom\_sign)? - Result\_mul : Result\_mul \quad (10)$$

$$Result = Result\_temp \quad (11)$$

$$Result\_final = Clamp(Result) \quad (12)$$

where Result_temp may be a temporary result, ? may be an operation that determines a sign of Result_temp based on the numerator sign and denominator sign, Result may be the signed fixed point divide result, Result_final may be a clamped signed fixed point divide result, and Clamp may be an operation that clamps an input. In general, both the discussed pre-processing and post-processing may be optional.

In general, divide module 120 may provide fixed point divide result 130 for any purpose. In some examples, fixed point denominator 102 and fixed point numerator 104 may be associated with an input image or a block of an input image, for example. In general, an image may include any suitable image data such as an image file or a video frame or the like. The block of the input image may include any suitable portion of image data such as, for example, a pixel or a plurality of pixels, or the like. Fixed point divide result 130 may be associated with an output image, for example.

As described, system 100 and the functions and operations discussed with respect to FIG. 1 may be optimized to determine a fixed point divide result for a fixed point denominator and a fixed point numerator when the fixed point denominator is greater than the fixed point numerator. In some implementations, such a situation may be exclusive or exceedingly common such that only a divide module 120 may be provided. However, in other implementations, another divide module may be provided to determine a fixed point divide result when the fixed point denominator is less than the fixed point numerator, when the relationship between the fixed point denominator and the fixed point numerator is uncertain, or the like.

Figure 2:
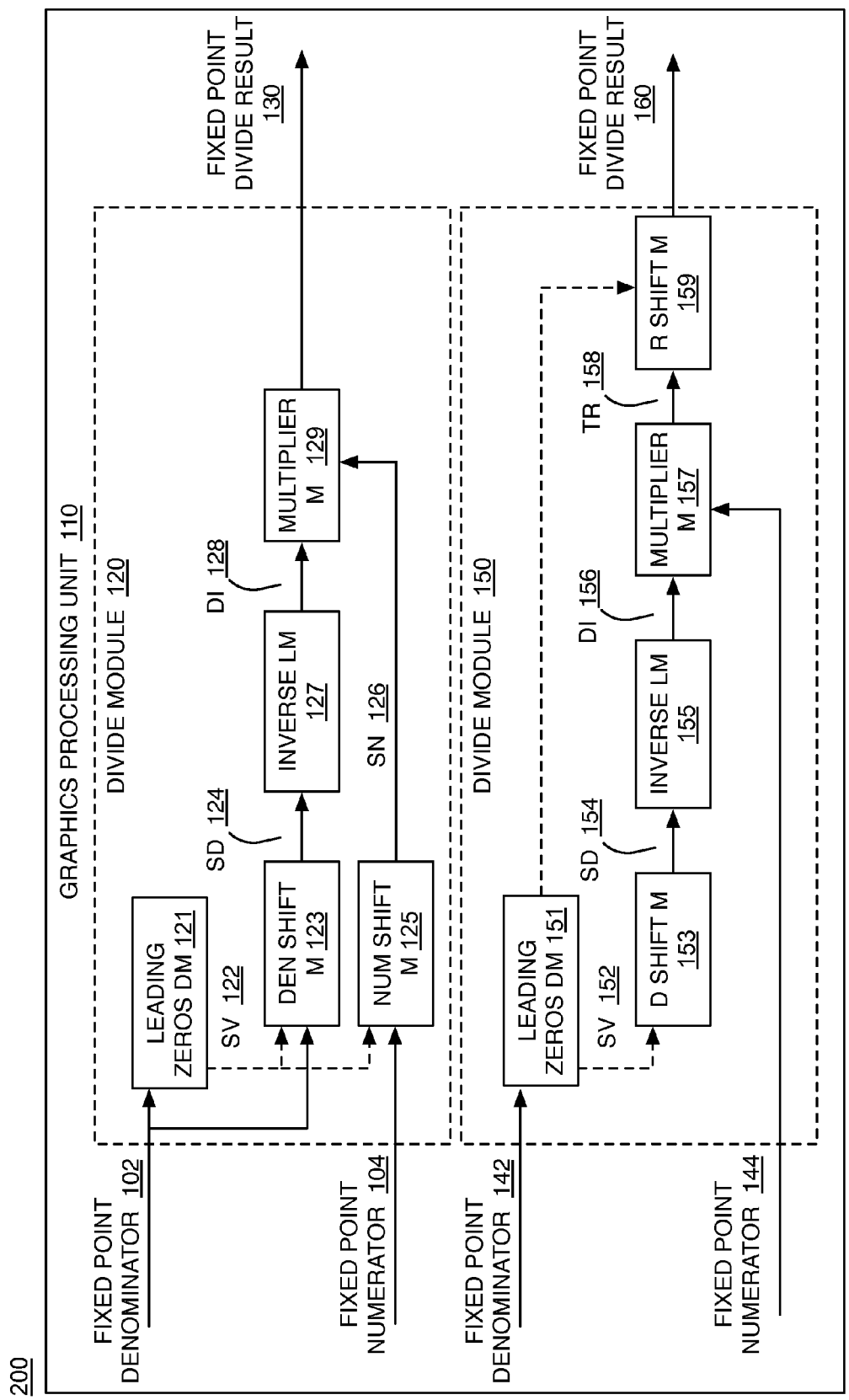
FIG. 2 is an illustrative diagram of a further example system for dividing fixed point numbers.

FIG. 2 is an illustrative diagram of an example system 200 for dividing fixed point numbers, arranged in accordance with at least some implementations of the present disclosure. As shown in FIG. 2, system 200 may include a graphics processing unit 110 having a divide module 120 and a divide module 150. Divide module 120 may provide fixed point divide result 130 for fixed point denominator 102 and fixed point numerator 104 when fixed point denominator 102 is greater than fixed point numerator 104 as discussed with respect to FIG. 1 above. Such operations will not be repeated for system 200 for the sake of brevity. Similarly, as will be appreciated, graphics processing unit 110 may include divide module 120 as shown in system 100 or both divide module 120 and divide module 150 as shown in system 200. Further, graphics processing unit 110 may include multiple divide modules 120, multiple divide modules 150, or multiples of both. As shown, in some examples, graphics processing unit 110 may separately implement divide module 120 and divide module 150. In other examples, the divide modules may share resources such as, for example, leading zeros determination modules, shift modules, inverse lookup modules, or multiplier modules, or the like. Graphics processing unit 110 may also include other operations modules such as, for example, memory, graphics drivers, video estimation module(s), luminance interpolation module(s), or the like.

As shown in FIG. 2, system 200 may include divide module 150. Divide module 150 may receive fixed point denominator 142 and fixed point numerator 144 and generate fixed point divide result 160. In general, fixed point denominator 142 and fixed point numerator 144 may include numbers of any values. In some examples, fixed point denominator 142 may be less than fixed point numerator 144, however divide module 150 may be operative regardless of the relationship of fixed point denominator 142 and fixed point numerator 144. Fixed point denominator 142 and fixed point numerator 144 may be associated with an input image, for example, as discussed with respect to fixed point denominator 102 and fixed point numerator 104. In some examples, fixed point denominator 102, fixed point numerator 104, fixed point denominator 142, and fixed point numerator 144 may be associated the same input image. In other examples, they may be associated with different input images. Fixed point denominator 142 and fixed point numerator 144 may be received from any suitable device or module. For example, they may be received from another module of graphics processing unit 210 or from a module outside of graphics processing unit 210 such as memory stores or the like. Similarly, fixed point divide result 160 may be provided or transmitted to any suitable device or module such as, for example, another module of graphics processing unit 110 or a module outside of graphics processing unit 110 such as memory stores, or the like.

Fixed point denominator 142 may be received at leading zeros detection module 151 which may determine the number of leading zeros of fixed point denominator 142 to generate a shift value 152. For example, shift value 152 may equal the number of leading zeros. In some examples, prior to processing at leading zeros detection module 151, a received input fixed point denominator may be pre-processed to generate fixed point denominator 142. Such pre-processing is not shown in FIG. 2 for the sake of clarity of presentation. In various examples, the pre-processing may be performed by divide module 150, another module of graphics processing unit 110, or another unit of system 100. For example, an input fixed point denominator may be pre-processed by determining a sign and an absolute value of the input fixed point denominator. The absolute value of the input fixed point denominator may be deemed to be fixed point denominator 142, for example. A received input fixed point numerator may be similarly pre-processed to generate fixed point numerator 144. For example, the input fixed point numerator may be pre-processed by determining a sign and an absolute value of the input fixed point numerator and the absolute value of the input fixed point denominator may be deemed to be fixed point denominator 142. An example of such optional pre-processing and operation of leading zeros detection module 151 may be shown as follows at equations (13)-(17):

$$\text{Denom\_abs} = \text{ABS}(\text{Denom\_input}) \quad (13)$$

$$\text{Numer\_abs} = \text{ABS}(\text{Numerator\_input}) \quad (14)$$

$$\text{Denom\_sign} = \text{SIGN}(\text{Denom\_input}) \quad (15)$$

$$\text{Numer\_sign} = \text{SIGN}(\text{Numerator\_input}) \quad (16)$$

$$\text{Shift\_value} = \text{LZ}(\text{Denom\_abs}) \quad (17)$$

where Denom_input may be the input fixed point denominator, Denom_abs may be the absolute value of the input fixed point denominator (and fixed point denominator 142), ABS may be an operation that returns the absolute value of the input number, Numerator_input may be the input fixed point numerator, Numer_abs may be the absolute value of the input fixed point numerator (and fixed point numerator 104), Denom_sign may be the denominator sign (i.e., the sign of the denominator), and Numer_sign may be the numerator sign (i.e., the sign of the numerator), SIGN may be an operation that returns the sign of the input value, Shift_value may be shift value 152 and LZ may be an operation that determines the number of leading zeros of the input value.

As shown in FIG. 2, shift value 152 may be transmitted to a denominator shift module 153 and denominator shift module 153 may receive fixed point denominator 142. Denominator shift module 153 may shift fixed point denominator 142 by shift value 152 to determine shifted denominator 154. Shifting fixed point denominator 142 by shift value 152 may include a bitwise arithmetic shift operation for example. Shifted denominator 154 may be a fixed point number. Shifted denominator 154 may be transmitted to an inverse lookup module 155 which may determine a denominator inverse 156 associated with shifted denominator 154. For example, inverse lookup module 155 may include or communicate with a lookup table that may include an array of denominator inverses (output) associated with shifted denominators (input).

Continuing the above example, the operations of denominator shift module 153 and inverse lookup module 155 may be shown as follows at equations (18) and (19):

$$\text{Denum\_shifted} = \text{Denom\_abs} << \text{Shift\_value} \quad (18)$$

$$\text{Inverse\_denom} = \text{LUT}(\text{Denum\_shifted}) \quad (19)$$

where Denum_shifted may be shifted denominator 154, A<<B may be an operation that performs a shift of A by B, Inverse_denom may be denominator inverse 156, and LUT may be an operation that evaluates a look up table for an output value associated with the input value.

As shown, denominator inverse 156 and fixed point numerator 144 may be transmitted to a multiplier module 157 which may perform a multiplication of denominator inverse 156 and fixed point numerator 144 to provide temporary result 158. Temporary result 158 may be a temporary fixed point divide result, for example. Temporary result 158 may be transmitted to result shift module 159, which may shift temporary result 158 by shift value 152 to determine fixed point divide result 160. Fixed point divide result 160 may be provided or transmitted to any suitable device or module such as, for example, another module of graphics processing unit 110 or a module outside of graphics processing unit 110 such as memory stores, or the like.

In some implementations, fixed point divide result 160 may be post-processed by, for example, changing the sign of the fixed point divide result, as needed, based on the numerator sign and denominator sign. Such processing may produce a signed fixed point divide result. Further post-processing may include clamping the signed fixed point divide result and/or transmitting the result to another module or unit, for example. Again continuing the above example, the operations of multiplier module 157, result shift module 159, and optional post-processing operations may be shown at equations (20)-(23) as follows:

$$Result\_mul = Inverse\_denom * Numerator\_input \quad (20)$$

$$Result\_temp = (Denom\_sign)? -Result\_mul : Result\_mul \quad (21)$$

$$Result = Result\_temp >> Shift\_value \quad (22)$$

$$Result\_final = Clamp(Result) \quad (23)$$

where Result_mul may be temporary result 150, A*B may be an operation that performs a multiplication of A and B, where Result_temp may be a temporary result, ? may be an operation that determines a sign of Result_temp based on the denominator sign, Result may be the signed fixed point divide result (i.e., Result may include the final sign; it is noted that Result_mul also includes a signed value), Result_final may be a clamped signed fixed point divide result, and Clamp may be an operation that clamps an input. As discussed, both the discussed pre-processing and post-processing may be optional.

As will be discussed in greater detail below, system 100 and/or system 200 may be used to perform some or all of the various functions discussed below in connection with FIGS. 3 and/or 4, or the functions previously discussed. As discussed above, a fixed point number may be a real data type or structure used to describe or approximate a real number in a computing environment. For example, a fixed point number may be a binary number having a fixed number of digits after and/or before a decimal point. A fixed point numbers may be stored in memory, manipulated by hardware, received as input and provided as output, and the like.

FIG. 3 is a flow chart illustrating an example process 300 for dividing fixed point numbers, arranged in accordance with at least some implementations of the present disclosure. In the illustrated implementation, process 300 may include one or more operations, functions or actions as illustrated by one or more of blocks 302, 304, 306, 308, 310, and/or 312. By way of non-limiting example, process 300 will be described herein with reference to example system 100 of FIG. 1 and/or 5.

Process 300 may be utilized as a computer-implemented method for dividing fixed point numbers. Process 300 may begin at block 302, "RECEIVE A FIXED POINT NUMERATOR AND A FIXED POINT DENOMINATOR GREATER THAN THE FIXED POINT NUMERATOR", where a fixed point numerator and a fixed point denominator may received. The fixed point denominator and fixed point numerator maybe associated with ain input image such that the fixed point denominator may be greater than the fixed point numerator and they may be received at a divide module, for example. In some examples, an input fixed point numerator and an input fixed point denominator may be pre-processed to determine the fixed point numerator and the fixed point denominator. The fixed point numerator and the fixed point denominator may be received at divide module 120, for example.

Processing may continue from operation 302 to operation 304, "DETECT A LEADING NUMBER OF ZEROS IN THE FIXED POINT DENOMINATOR TO DETERMINE A SHIFT VALUE", where a leading number of zeros in the fixed point denominator may be detected to determine a shift value. The shift value may equal the leading number of zeros, for example. The shift value may be determined at leading zeros detection module of divide module 120, for example.

Processing may continue from operation 304 to operation 306, "SHIFT THE FIXED POINT DENOMINATOR BY THE SHIFT VALUE TO DETERMINE A SHIFTED DENOMINATOR", where the fixed point denominator may be shifted by the shift value to determine a shifted denominator. Shifting the fixed point denominator may include a bitwise arithmetic shift operation and the shifted denominator may be a fixed point number. The shifting may be performed by denominator shift module 123, for example, which may have received shift value 122 and fixed point denominator 102.

Processing may continue from operation 306 to operation 308, "SHIFT THE FIXED POINT NUMERATOR BY THE SHIFT VALUE TO DETERMINE A SHIFTED NUMERATOR", where the fixed point numerator may be shifted by the shift value to determine a shifted numerator. Shifting the fixed point numerator may also include a bitwise arithmetic shift operation and the shifted numerator may be a fixed point number. The shifting may be performed by numerator shift module 125, for example, which may have received shift value 122 and fixed point numerator 104. As discussed, in some examples, the operations of process 300 may be performed in other orders or in parallel. In particular, in some examples, operation 306 and operation 308 may be performed in parallel.

Processing may continue from operation 308 to operation 310, "DETERMINE A FIXED POINT INVERSE DENOMINATOR ASSOCIATED WITH THE SHIFTED DENOMINATOR", where a fixed point inverse denominator associated with the shifted denominator may be determined. The fixed point inverse denominator may be determined at inverse lookup module 127, for example, which may include or communicate with a lookup table to determine denominator inverse 128 based on shifted denominator 124.

Processing may continue from operation 310 to operation 312, "PERFORM A MULTIPLICATION OF THE FIXED POINT INVERSE DENOMINATOR AND THE SHIFTED NUMERATOR TO DETERMINE A FIXED POINT DIVIDE RESULT", where a multiplication of the fixed point inverse denominator and the shifted numerator may be performed to determine a fixed point divide result. The multiplication may be performed by multiplier module 129, for example, which may have denominator inverse 128 and shifted numerator 126. The fixed point divide result may be associated with an output image, for example.

As discussed herein, the order of operation of blocks 302-312 may be performed in any suitable order. In particular, blocks 306, 308, and 310 may be performed in any order such that the shifted denominator is available for the determination of the fixed point inverse denominator and such that the fixed point inverse denominator and the shifted numerator are available for multiplication.

Some additional and/or alternative details related to process 200 may be illustrated in one or more examples of implementations discussed in greater detail below with regard to FIG. 4.

Figure 4:
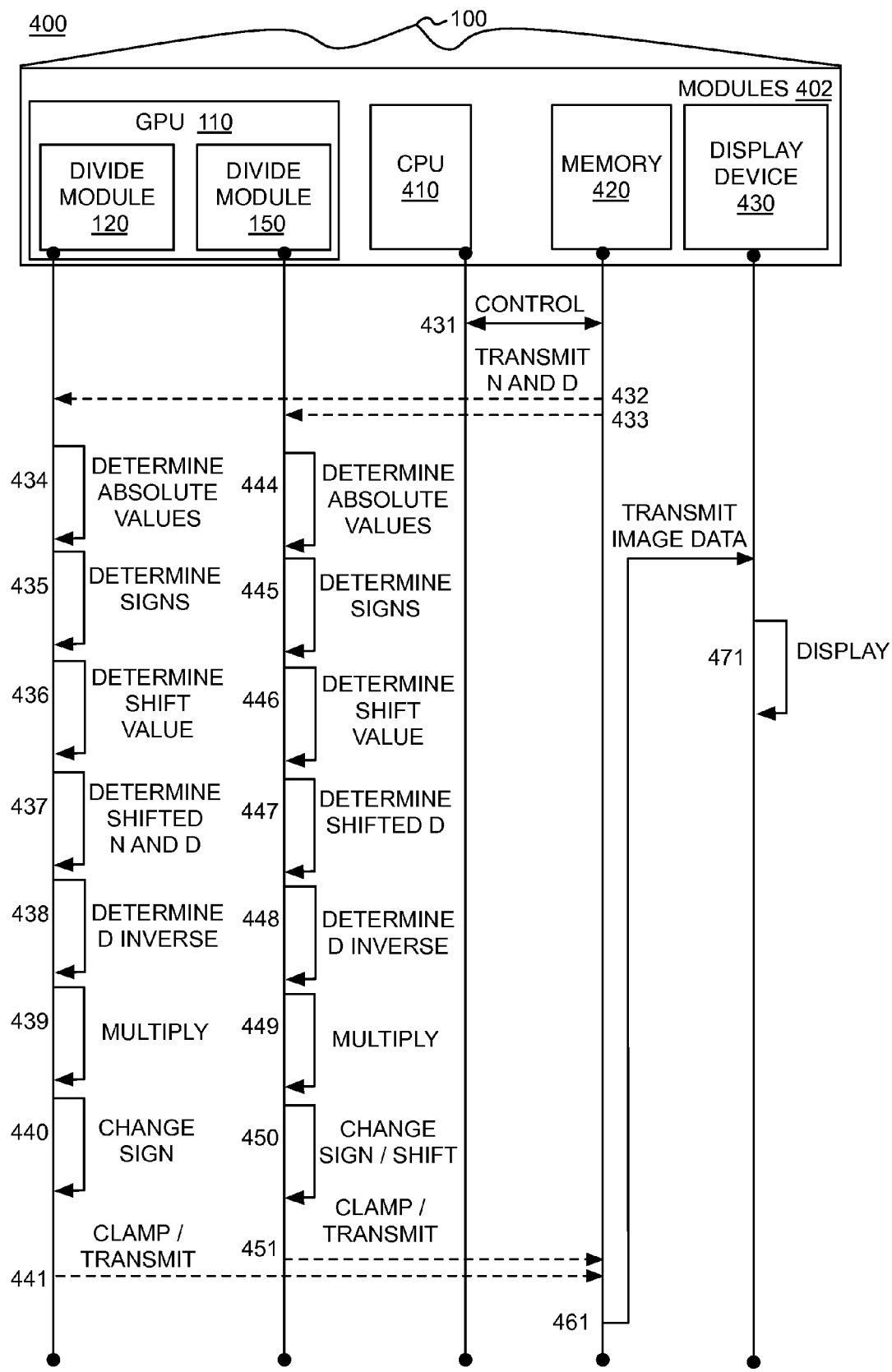
FIG. 4 is an illustrative diagram of an example process for dividing fixed point numbers in operation.

FIG. 4 is an illustrative diagram of example system 100 and process 400 for dividing fixed point numbers in operation, arranged in accordance with at least some implementations of the present disclosure. In the illustrated implementation, process 400 may include one or more operations, functions or actions as illustrated by one or more of operations 431, 432, 433, 434, 435, 436, 437, 438, 439, 440, 441, 444, 445, 446, 447, 448, 449, 450, 451, 461, and/or 471. By way of non-limiting example, process 400 will be described herein with reference to example systems 100 and 200 of FIG. 1, FIG. 2 and/or FIG. 5.

In the illustrated implementation, system 100 may include modules 402, the like, and/or combinations thereof. For example, modules 402, may include graphics processing unit 120, central processing unit 410, memory 420, and/or display device 430, the like, and/or combinations thereof. Central processing unit 410 may include one or more processors and may be communicatively coupled to display device 430, for example. Memory 420 may include one or more memory stores and may be communicatively coupled to central processing unit 410, for example. Display device 430 may include any suitable display device configured to present image data, for example. As shown, graphics processing unit 120 may include divide module 120 and divide module 150.

Divide module 120 may be configured to receive a fixed point numerator and a fixed point denominator from memory 420, such that the fixed point denominator is greater than the fixed point numerator, detect a leading number of zeros in the fixed point denominator to determine a shift value, shift the fixed point denominator by the shift value to determine a shifted denominator, shift the fixed point numerator by the shift value to determine a shifted numerator, determine a fixed point denominator inverse associated with the shifted denominator, perform a multiplication of the fixed point denominator inverse and the shifted numerator to determine a fixed point divide result for the fixed point numerator and the fixed point denominator, and transmit the fixed point divide result to memory 420. Divide module 120 may be further configured to perform other operations as is discussed further herein.

Divide module 150 may be configured to receive a second fixed point numerator and a second fixed point denominator from memory 420, detect a leading number of zeros in the second fixed point denominator to determine a second shift value, shift the second fixed point denominator by the second shift value to determine a second shifted denominator, determine a second fixed point denominator inverse associated with the second shifted denominator, perform a multiplication of the second fixed point denominator inverse and the second fixed point numerator to determine a temporary fixed point divide result, shift the temporary fixed point divide result by the second shift value to generate a second fixed point divide result for the second fixed point numerator and the second fixed point denominator, and transmit the second fixed point divide result to memory 420. Divide module 150 may be further configured to perform other operations as is discussed further herein.

Process 400 may be utilized as a computer-implemented method for dividing fixed point numbers. Process 400 may begin at operation 431 (unlabeled) and 432 and 433, each labeled "TRANSMIT FIXED POINT N AND D", where a fixed point numerator and a fixed point denominator may be transmitted from memory 420 under the control of central processing unit 410, for example, and received at divide module 120 or divide module 150. As discussed herein, in examples where the fixed point denominator is greater than the fixed point numerator, the fixed point denominator and fixed point numerator may be transmitted to and received by divide module 120. In examples where the opposite is true or where the relationship is not known, the fixed point denominator and fixed point numerator may be transmitted to and received by divide module 150. In general, central processing unit 410 may control the operation of memory 420 as shown. In some examples, central processing unit 410 may also control the operation of graphics processing unit 110.

Processing may continue from operation 432 at operation 434 "DETERMINE ABSOLUTE VALUES" or at operation 436 "DETERMINE SHIFT VALUE". As discussed herein, in some examples, the received fixed point numerator and denominator may undergo pre-processing. Such received numerator and denominator have been described herein as an input fixed point numerator and an input fixed point denominator. After pre-processing, for example, the numerator and denominator have been described as a fixed point numerator and a fixed point denominator. In other examples, the numerator and denominator may not require pre-processing or no pre-processing may be performed such that the fixed point numerator and the fixed point denominator are received and ready for processing. In such example, the ready for processing numerator an denominator have also been described as a fixed point numerator and a fixed point denominator. In any event, processing via divide module 120 on a fixed point numerator and denominator (e.g., when the denominator is greater than the numerator) may include detecting a leading number of zeros in the fixed point denominator to determine a shift value, shifting the fixed point denominator and the fixed point numerator by the shift value to determine a shifted denominator and a shifted numerator, determining a fixed point denominator inverse associated with the shifted denominator, and performing a multiplication of the fixed point denominator inverse and the shifted numerator to determine a fixed point divide result for the fixed point numerator and the fixed point denominator.

As discussed, in examples, where pre-processing is performed, processing may continue at operation 434, "DETERMINE ABSOLUTE VALUES", where an absolute value of the input fixed point numerator and an absolute value of the input fixed point denominator may be determined to generate a fixed point numerator and a fixed point denominator, respectively. As discussed, the fixed point numerator and the fixed point denominator may be processed as discussed to determine a fixed point divide result.

Processing may continue from operation 434 to operation 435, "DETERMINE SIGNS", where a numerator sign for the input fixed point numerator and a denominator sign for the input fixed point denominator may be determined.

Processing may continue at operation 436 "DETERMINE SHIFT VALUE" from any of operation 432, 434, or 435, as discussed. At operation 436, a leading number of zeros in the fixed point denominator may be detected to determine a shift value. The shift value may equal the leading number of zeros, for example. The shift value may be determined at leading zeros detection module of divide module 120, for example.

Processing may continue from operation 436 to operation 437, "DETERMINE SHIFTED N AND D", where a the fixed point denominator may be shifted by the shift value to determine a shifted denominator and the fixed point numerator may be shifted by the shift value to determine a shifted numerator. Shifting the fixed point denominator and numerator may include a bitwise arithmetic shift operation and the shifted denominator and the shifted numerator may be fixed point numbers. The shifting may be performed by divide module 120, for example.

Processing may continue from operation 437 to operation 438, "DEERMINE D INVERSE", where a fixed point inverse denominator associated with the shifted denominator may be determined. The fixed point inverse denominator may be determined at an inverse lookup module of divide module 120, for example. The inverse lookup module may include or communicate with a lookup table to determine fixed point inverse denominator based on the shifted denominator.

Processing may continue from operation 438 to operation 439, "MULTIPLY", where a multiplication of the fixed point inverse denominator and the shifted numerator may be performed to determine a fixed point divide result. The multiplication may be performed by multiplier module of divide module 120, for example.

Processing may continue from operation 439 to operation 440, "CHANGE SIGN" or operation 441, "CLAMP/TRANSMIT". At operation 440, the sign of the fixed point divide result may be changed, as needed, based on the numerator sign and denominator sign determined at operation 435 to generate a signed fixed point divide result. In such examples, processing may continue from operation 440 to operation 441. In either event, at operation 441, the result (e.g., the fixed point divide result or the signed fixed point divide result) may be clamped and/or transmitted to memory 420. The result may be associated with an output image, for example, as discussed herein.

Processing may continue at operation 444, "DETERMINE ABSOLUTE VALUES" or operation 461, "TRANSMIT IMAGE DATA" or processing may repeat as needed at operation 432. As will be appreciated the operations discussed may be repeated as needed to complete data processing such as, for example, graphics or image processing. Either upon completion of processing or as processing is completed, image data may be transmitted at operation 461.

In some examples, processing may continue from operation 433 to operation 444 "DETERMINE ABSOLUTE VALUES" or at operation 446, "DETERMINE SHIFT VALUE". As discussed herein and with respect to operations 434 and 436 above, in some examples, the received fixed point numerator and denominator may undergo pre-processing. In such examples, a received numerator and denominator may be described as an input fixed point numerator and an input fixed point denominator. After pre-processing, for example, the numerator and denominator may be described as a fixed point numerator and a fixed point denominator. In other examples, the numerator and denominator may not require pre-processing or no pre-processing may be performed such that the fixed point numerator and the fixed point denominator are received and ready for processing and, in such examples, the received numerator an denominator have also been described as a fixed point numerator and a fixed point denominator.

As discussed, in examples, where pre-processing is performed, processing may continue at operation 444, "DETERMINE ABSOLUTE VALUES", where an absolute value of the input fixed point numerator and an absolute value of the input fixed point denominator may be determined to generate a fixed point numerator and a fixed point denominator, respectively. As discussed, the fixed point numerator and the fixed point denominator may be processed as discussed to determine a fixed point divide result.

Processing may continue from operation 444 to operation 445, "DETERMINE SIGNS", where a numerator sign for the input fixed point numerator and a denominator sign for the input fixed point denominator may be determined.

Processing may continue at operation 446 "DETERMINE SHIFT VALUE" from any of operation 433, 444, or 445, as discussed. At operation 446, a leading number of zeros in the fixed point denominator may be detected to determine a shift value. The shift value may equal the leading number of zeros, for example. The shift value may be determined at leading zeros detection module of divide module 150, for example.

Processing may continue from operation 446 to operation 447, "DETERMINE SHIFTED D", where the fixed point denominator may be shifted by the shift value to determine a shifted. Shifting the fixed point denominator may include a bitwise arithmetic shift operation and the shifted denominator may be fixed point numbers. The shifting may be performed by divide module 150, for example.

Processing may continue from operation 447 to operation 448, "DEERMINE D INVERSE", where a fixed point inverse denominator associated with the shifted denominator may be determined. The fixed point inverse denominator may be determined at an inverse lookup module of divide module 150, for example. The inverse lookup module may include or communicate with a lookup table to determine fixed point inverse denominator based on the shifted denominator.

Processing may continue from operation 448 to operation 449, "MULTIPLY", where a multiplication of the fixed point inverse denominator and the fixed point numerator may be performed to determine a temporary fixed point divide result. The multiplication may be performed by a multiplier module of divide module 150, for example.

Processing may continue from operation 449 to operation 450, "CHANGE SIGN/SHIFT", where the sign of the temporary fixed point divide result may be changed, as needed, based on the numerator sign and the denominator sign determined at operation 445 to generate a signed temporary fixed point divide result and the temporary fixed point divide result may be shifted by the shift value determined at operation 446 to generate a fixed point divide result. In some examples, the shift of the signed temporary fixed point divide result may be in an opposite direction of the shifting of the fixed point denominator at operation 447.

Processing may continue from operation 450 to operation 451, "CLAMP/TRANSMIT", where the fixed point divide result may be clamped and/or transmitted to memory 420. The fixed point divide result may be associated with an output image, for example, as discussed herein.

As discussed, either upon completion of processing or as processing is completed, image data may be transmitted at operation 461, "TRANSMIT IMAGE DATA", where image data may be transmitted from memory 420 to display device 430. In some examples, such a transmission may be completed under control of central processing unit 410 as indicated by operation 431. Processing may continue at operation 471, "DISPLAY", where display device 430 may display or present the image data for viewing by a user, for example. As discussed, the image data may include an output image based on the determined fixed point divide result(s).

While implementation of example processes 300, 400, and processes discussed with respect to FIG. 1 and FIG. 2 may include the undertaking of all operations shown in the order illustrated, the present disclosure is not limited in this regard and, in various examples, implementation of processes 200 and 300 may include the undertaking only a subset of the blocks shown and/or in a different order than illustrated.

In addition, any one or more of the blocks of FIGS. 1-4 may be undertaken in response to instructions provided by one or more computer program products. Such program products may include signal bearing media providing instructions that, when executed by, for example, a processor, may provide the functionality described herein. The computer program products may be provided in any form of computer readable medium. Thus, for example, a processor including one or more processor core(s) may undertake one or more of the blocks shown in FIGS. 1-4, and processes discussed with respect to FIGS. 1-4.

As used in any implementation described herein, the terms "module" refers to any combination of software, firmware and/or hardware configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 5:
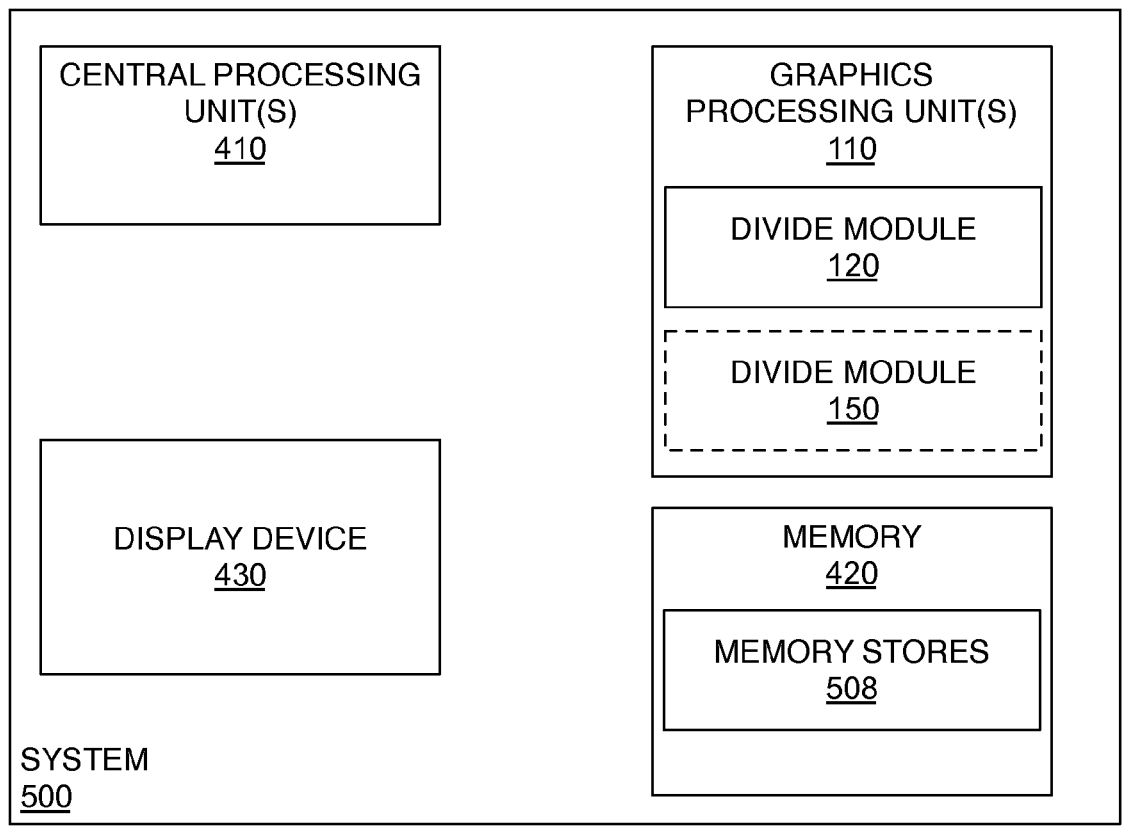
FIG. 5 is an illustrative diagram of an example system for dividing fixed point numbers.

FIG. 5 is an illustrative diagram of an example system 500 for dividing fixed point numbers, arranged in accordance with at least some implementations of the present disclosure. In the illustrated implementation, system 500 may include one or more central processing units 410, memory 420, which may include one or more memory stores 508, one or more graphics processing units 110, and/or a display device 430. Central processing units 410, memory 420 and graphics processing units 110 may be capable of communication with one another, via, for example, a bus or other access. In various implementations, display device 430 may be integrated in system 500 or implemented separately from system 500.

As shown in FIG. 5, and discussed above, divide module 140 may be implemented via graphics processing units 110. Similarly, divide module 150 may be implemented graphics processing units 110. As shown, and as discussed above, divide module 150 may be optional. Further, as discussed, divide module 120 may be used for fixed point divide when a fixed point denominator is greater than a fixed point numerator. Divide module 150, if implemented, may be used for fixed point divide when a fixed point denominator is less than a fixed point numerator or when their relationship is not known or uncertain.

As will be appreciated, the modules illustrated in FIG. 5 may include a variety of software and/or hardware modules and/or modules that may be implemented via software and/or hardware. For example, the modules may be implemented as software via central processing units 410 and/or graphics processing units 110 or the modules may be implemented via a dedicated hardware portion or portions of graphics processing units 110. Further, the shown memory stores 508 may be shared memory for central processing units 410 and/or graphics processing units 110, for example. Also, system 500 may be implemented in a variety of ways. For example, system 500 (excluding display device 430) may be implemented as a single chip or device having a graphics processor, a quad-core central processing unit, on-board cache, and a memory controller input/output (I/O) module (not shown). In other examples, system 500 (again excluding display device 430) may be implemented as a chipset.

Central processing units 410 may include any suitable implementation including, for example, microprocessor(s), multicore processors, application specific integrated circuits, chip(s), chipsets, or the like. Further, graphics processing units 110 may include any suitable implementation including, for example, processor(s), multicore processors, application specific integrated circuits, programmable logic devices, graphics cards, integrated graphics, general purpose graphics processing unit(s), or the like. In addition, memory stores 508 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 408 may be implemented by cache memory. In various examples, system 500 may be implemented as a chipset or as a system on a chip.

Figure 6:
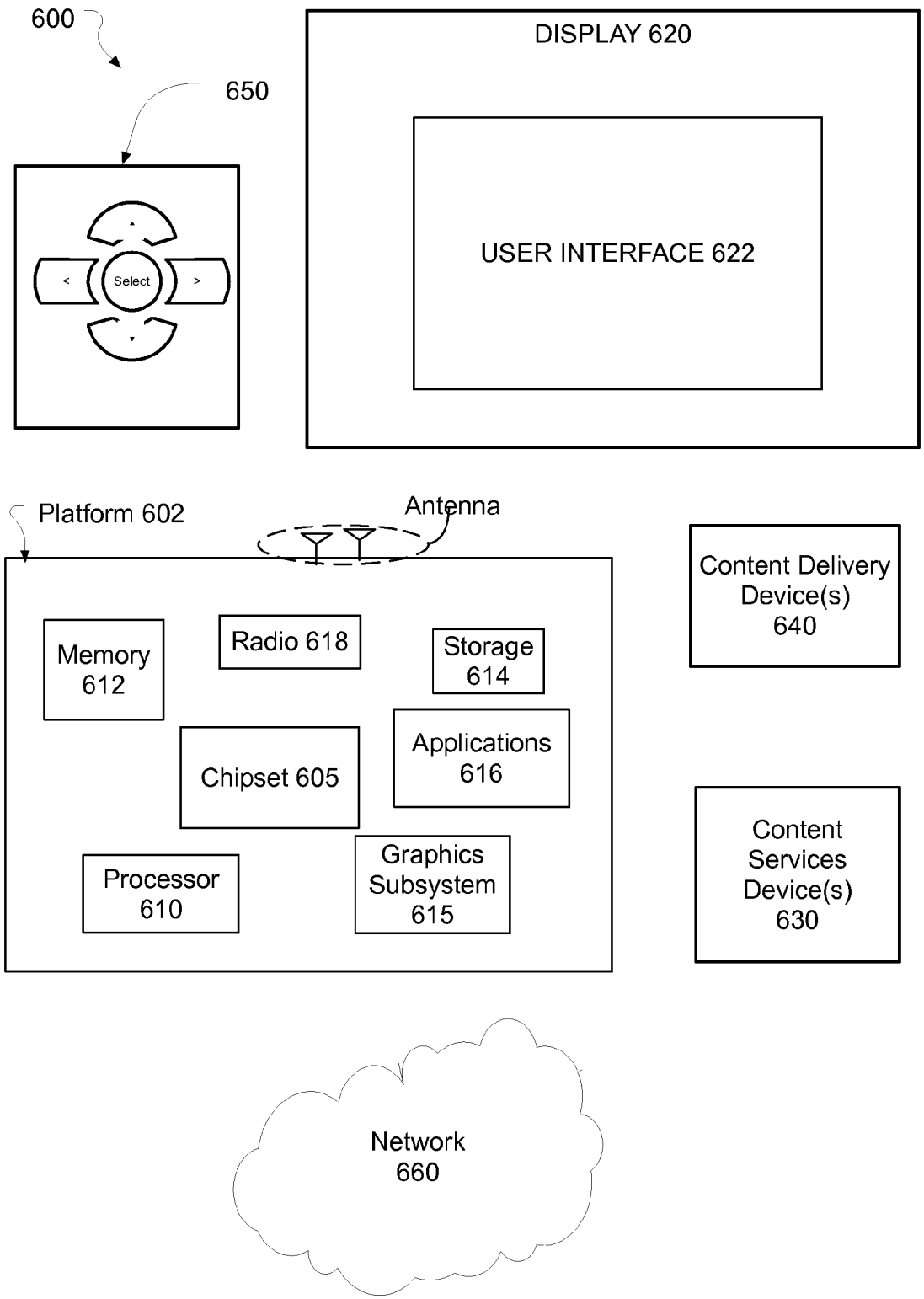
FIG. 6 is an illustrative diagram of an example system.

FIG. 6 illustrates an example system 600 in accordance with the present disclosure. In various implementations, system 600 may be a media system although system 600 is not limited to this context. For example, system 600 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 600 includes a platform 602 coupled to a display 620. Platform 602 may receive content from a content device such as content services device(s) 630 or content delivery device(s) 640 or other similar content sources. A navigation controller 650 including one or more navigation features may be used to interact with, for example, platform 602 and/or display 620. Each of these components is described in greater detail below.

In various implementations, platform 602 may include any combination of a chipset 605, processor 610, memory 612, storage 614, graphics subsystem 615, applications 616 and/or radio 618. Chipset 605 may provide intercommunication among processor 610, memory 612, storage 614, graphics subsystem 615, applications 616 and/or radio 618. For example, chipset 605 may include a storage adapter (not depicted) capable of providing intercommunication with storage 614.

Processor 610 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 610 may be dual-core processor(s), dual-core mobile processor(s), and so forth.

Memory 612 may be implemented as a volatile memory device such as, but not limited to, a Random Access Memory (RAM), Dynamic Random Access Memory (DRAM), or Static RAM (SRAM).

Storage 614 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 614 may include technology to increase the storage performance enhanced protection for valuable digital media when multiple hard drives are included, for example.

Graphics subsystem 615 may perform processing of images such as still or video for display. Graphics subsystem 615 may be a graphics processing unit (GPU) or a visual processing unit (VPU), for example. An analog or digital interface may be used to communicatively couple graphics subsystem 615 and display 620. For example, the interface may be any of a High-Definition Multimedia Interface, Display Port, wireless HDMI, and/or wireless HD compliant techniques. Graphics subsystem 615 may be integrated into processor 610 or chipset 605. In some implementations, graphics subsystem 615 may be a stand-alone card communicatively coupled to chipset 605.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 618 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 618 may operate in accordance with one or more applicable standards in any version.

In various implementations, display 620 may include any television type monitor or display. Display 620 may include, for example, a computer display screen, touch screen display, video monitor, television-like device, and/or a television. Display 620 may be digital and/or analog. In various implementations, display 620 may be a holographic display. Also, display 620 may be a transparent surface that may receive a visual projection. Such projections may convey various forms of information, images, and/or objects. For example, such projections may be a visual overlay for a mobile augmented reality (MAR) application. Under the control of one or more software applications 616, platform 602 may display user interface 622 on display 620.

In various implementations, content services device(s) 630 may be hosted by any national, international and/or independent service and thus accessible to platform 602 via the Internet, for example. Content services device(s) 630 may be coupled to platform 602 and/or to display 620. Platform 602 and/or content services device(s) 630 may be coupled to a network 660 to communicate (e.g., send and/or receive) media information to and from network 660. Content delivery device(s) 640 also may be coupled to platform 602 and/or to display 620.

In various implementations, content services device(s) 630 may include a cable television box, personal computer, network, telephone, Internet enabled devices or appliance capable of delivering digital information and/or content, and any other similar device capable of unidirectionally or bidirectionally communicating content between content providers and platform 602 and/display 620, via network 660 or directly. It will be appreciated that the content may be communicated unidirectionally and/or bidirectionally to and from any one of the components in system 600 and a content provider via network 660. Examples of content may include any media information including, for example, video, music, medical and gaming information, and so forth.

Content services device(s) 630 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 602 may receive control signals from navigation controller 650 having one or more navigation features. The navigation features of controller 650 may be used to interact with user interface 622, for example. In embodiments, navigation controller 650 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 650 may be replicated on a display (e.g., display 620) by movements of a pointer, cursor, focus ring, or other visual indicators displayed on the display. For example, under the control of software applications 616, the navigation features located on navigation controller 650 may be mapped to virtual navigation features displayed on user interface 622, for example. In embodiments, controller 650 may not be a separate component but may be integrated into platform 602 and/or display 620. The present disclosure, however, is not limited to the elements or in the context shown or described herein.

In various implementations, drivers (not shown) may include technology to enable users to instantly turn on and off platform 602 like a television with the touch of a button after initial boot-up, when enabled, for example. Program logic may allow platform 602 to stream content to media adaptors or other content services device(s) 630 or content delivery device(s) 640 even when the platform is turned "off." In addition, chipset 605 may include hardware and/or software support for 8.1 surround sound audio and/or high definition (7.1) surround sound audio, for example. Drivers may include a graphics driver for integrated graphics platforms. In embodiments, the graphics driver may comprise a peripheral component interconnect (PCI) Express graphics card.

In various implementations, any one or more of the components shown in system 600 may be integrated. For example, platform 602 and content services device(s) 630 may be integrated, or platform 602 and content delivery device(s) 640 may be integrated, or platform 602, content services device(s) 630, and content delivery device(s) 640 may be integrated, for example. In various embodiments, platform 602 and display 620 may be an integrated unit. Display 620 and content service device(s) 630 may be integrated, or display 620 and content delivery device(s) 640 may be integrated, for example. These examples are not meant to limit the present disclosure.

In various embodiments, system 600 may be implemented as a wireless system, a wired system, or a combination of both. When implemented as a wireless system, system 600 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 600 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 602 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 6.

Figure 7:
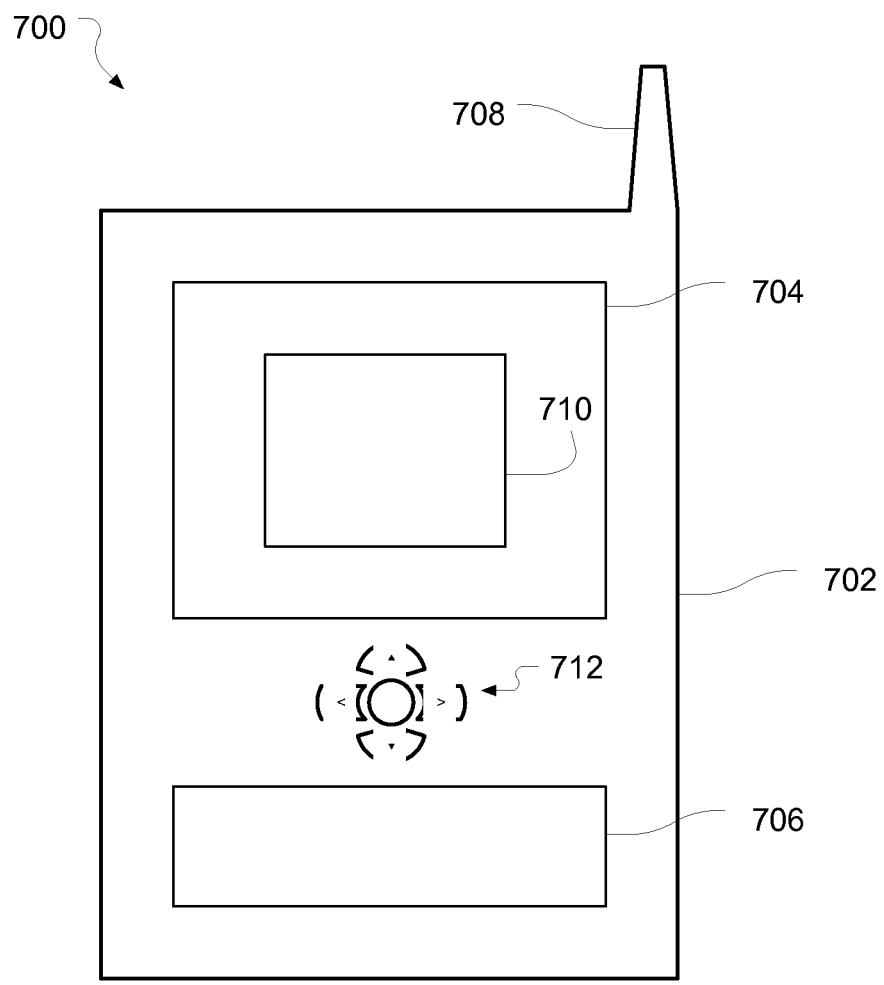
FIG. 7 is an illustrative diagram of an example system, all arranged in accordance with at least some implementations of the present disclosure.

As described above, system 600 may be embodied in varying physical styles or form factors. FIG. 7 illustrates implementations of a small form factor device 700 in which system 600 may be embodied. In embodiments, for example, device 700 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 7, device 700 may include a housing 702, a display 704, an input/output (I/O) device 706, and an antenna 708. Device 700 also may include navigation features 712. Display 704 may include any suitable display unit for displaying information appropriate for a mobile computing device. I/O device 706 may include any suitable I/O device for entering information into a mobile computing device. Examples for I/O device 706 may include an alphanumeric keyboard, a numeric keypad, a touch pad, input keys, buttons, switches, rocker switches, microphones, speakers, voice recognition device and software, and so forth. Information also may be entered into device 700 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one example, a computer-implemented method for dividing fixed point numbers may include receiving a fixed point numerator and a fixed point denominator associated with an input image such that the fixed point denominator is greater than the fixed point numerator. A leading number of zeros in the fixed point denominator may be detected to determine a shift value. The fixed point denominator may be shifted by the shift value to determine a shifted denominator. The fixed point numerator may be shifted by the shift value to determine a shifted numerator. A fixed point denominator inverse associated with the shifted denominator may be determined. A multiplication of the fixed point denominator inverse and the shifted numerator may be performed to determine a fixed point divide result for the fixed point numerator and the fixed point denominator such that the fixed point divide result is associated with an output image.

In a further example of a computer-implemented method for dividing fixed point numbers, an input fixed point numerator and an input fixed point denominator associated with the input image may be received. An absolute value of the input fixed point numerator may be determined to generate the fixed point numerator. An absolute value of the input fixed point denominator may be determined to generate the fixed point denominator. A numerator sign of the input fixed point numerator may be determined. A denominator sign of the input fixed point denominator may be determined. A sign of the fixed point divide result may be changed, as needed, based on the numerator sign and the denominator sign to generate a signed fixed point divide result. The signed fixed point divide result may be clamped. The signed fixed point divide result may be transmitted. A second input fixed point numerator and a second input fixed point denominator may be received such that the second input fixed point denominator is less than the second input fixed point numerator. An absolute value of the second input fixed point numerator may be determined to generate a second fixed point numerator. An absolute value of the second input fixed point denominator may be determined to generate a second fixed point denominator. A second numerator sign of the second input fixed point numerator may be determined A second denominator sign of the second input fixed point denominator may be determined. A leading number of zeros in the second fixed point denominator may be detected to determine a second shift value. The second fixed point denominator may be shifted by the second shift value to determine a second shifted denominator. A second fixed point denominator inverse associated with the second shifted denominator may be determined. A multiplication of the second fixed point denominator inverse and the second fixed point numerator may be performed to determine a temporary fixed point divide result. A sign of the temporary fixed point divide result may be changed, as needed, based on the numerator sign and the denominator sign to generate a signed temporary fixed point divide result. The signed temporary fixed point divide result may be shifted by the second shift value to generate a second fixed point divide result for the second fixed point numerator and the second fixed point denominator such that shifting the signed temporary fixed point divide result may be in an opposite direction of shifting the second fixed point denominator. The second signed fixed point divide result may be clamped. The second fixed point divide result may be transmitted. Determining the fixed point denominator inverse associated with the shifted denominator may include determining the fixed point denominator inverse using a lookup table and such that determining the fixed point denominator inverse associated with the shifted denominator may include an optimization associated with a predetermined precision threshold. Performing the multiplication of the second fixed point denominator inverse and the second fixed point numerator and performing the multiplication of the shifted fixed point denominator inverse and the shifted numerator may include performing the multiplications via a graphics processing unit. Performing the multiplication of the shifted fixed point denominator inverse and the shifted numerator may include using fewer gates than performing the multiplication of the second fixed point denominator inverse and the second fixed point numerator. Performing the multiplication of the shifted fixed point denominator inverse and the shifted numerator may include a greater precision than performing the multiplication of the second fixed point denominator inverse and the second fixed point numerator. The input image may include at least one of an image file or a video frame. The fixed point numerator and the fixed point denominator may be associated with a block of the input image, and the block may include at least one of a single pixel or a plurality of pixels. The fixed point numerator may be at least one of 8 bits, 16 bits, 24 bits, or 32 bits.

In another example, a system for dividing fixed point numbers on a device may include a display device, one or more processors, one or more memory stores, and a divide module. The display device may be configured to present image data. The one or more processors may be communicatively coupled to the display device. The one or more memory stores may be communicatively coupled to the one or more processors. The divide module may be configured to receive a fixed point numerator and a fixed point denominator associated with an input image from the one or more memory stores such that the fixed point denominator is greater than the fixed point numerator, detect a leading number of zeros in the fixed point denominator to determine a shift value, shift the fixed point denominator by the shift value to determine a shifted denominator, shift the fixed point numerator by the shift value to determine a shifted numerator, determine a fixed point denominator inverse associated with the shifted denominator, perform a multiplication of the fixed point denominator inverse and the shifted numerator to determine a fixed point divide result for the fixed point numerator and the fixed point denominator, and transmit the fixed point divide result to the one or more memory stores. The presentment of image data via the display device may be based at least in part on the determined fixed point divide result.

In a further example of a system for dividing fixed point numbers on a device, the system may include a second divide module. The second divide module may be configured to receive a second input fixed point numerator and a second input fixed point denominator from the one or more memory stores such that the second input fixed point denominator is less than the second input fixed point numerator, determine an absolute value of the second input fixed point numerator to generate a second fixed point numerator, determine an absolute value of the second input fixed point denominator to generate a second fixed point denominator, determine a second numerator sign of the second input fixed point numerator, determine a second denominator sign of the second input fixed point denominator, detect a leading number of zeros in the second fixed point denominator to determine a second shift value, shift the second fixed point denominator by the second shift value to determine a second shifted denominator, determine a second fixed point denominator inverse associated with the second shifted denominator, perform a multiplication of the second fixed point denominator inverse and the second fixed point numerator to determine a temporary fixed point divide result, change a sign of the temporary fixed point divide result, as needed, based on the numerator sign and the denominator sign to generate a signed temporary fixed point divide result, shift the signed temporary fixed point divide result by the second shift value to generate a second fixed point divide result for the second fixed point numerator and the second fixed point denominator such that shifting the signed temporary fixed point divide result is in an opposite direction of shifting the second fixed point denominator, clamp the second signed fixed point divide result, and transmit the second fixed point divide result to the one or more memory stores. The divide module may be further configured to receive an input fixed point numerator and an input fixed point denominator associated with the input image, determine an absolute value of the input fixed point numerator to generate the fixed point numerator, determine an absolute value of the input fixed point denominator to generate the fixed point denominator, determine a numerator sign of the input fixed point numerator, determine a denominator sign of the input fixed point denominator, change the sign of the fixed point divide result, as needed, based on the numerator sign and the denominator sign to generate a signed fixed point divide result, clamp the signed fixed point divide result, and transmit the signed fixed point divide result. The one or more processors may be configured to direct the one or more memory stores to transmit and receive data from the divide module and the second divide module. The divide module may be configured to determine the fixed point denominator inverse associated with the shifted denominator using a lookup table. Determining the fixed point denominator inverse associated with the shifted denominator may include an optimization associated with a predetermined precision threshold. The input image may include at least one of an image file or a video frame. The fixed point numerator and the fixed point denominator may be associated with a block of the input image. The block may include at least one of a single pixel or a plurality of pixels. The fixed point numerator may be at least one of 8 bits, 16 bits, 24 bits, or 32 bits. The divide module and the second divide module may be implemented via a graphics processing unit. The multiplication of the shifted fixed point denominator inverse and the shifted numerator may use fewer gates than the multiplication of the second fixed point denominator inverse and the second fixed point numerator. The multiplication of the shifted fixed point denominator inverse and the shifted numerator may include a greater precision than the multiplication of the second fixed point denominator inverse and the second fixed point numerator.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, such the above examples are not limited in this regard and, in various implementations, the above examples may include the undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

What is claimed:

1. A computer-implemented method for dividing fixed point numbers comprising:
    receiving, by one or more processors, a pixel image data fixed point numerator and a pixel image data fixed point denominator associated with an input image, wherein the fixed point denominator is greater than the fixed point numerator;
    detecting, by one or more processors, a leading number of zeros in the fixed point denominator to determine a shift value;
    shifting, by one or more processors, the fixed point denominator by the shift value to determine a shifted denominator;
    shifting, by one or more processors, the fixed point numerator by the shift value to determine a shifted numerator;
    determining, by one or more processors, a fixed point denominator inverse associated with the shifted denominator;
    performing, by one or more processors, a multiplication of the fixed point denominator inverse and the shifted numerator to determine a fixed point divide result for the fixed point numerator and the fixed point denominator, wherein the fixed point divide result is associated with an output image; and
    by one or more processors:
        receiving an input fixed point numerator and an input fixed point denominator associated with the input image;
        determining an absolute value of the input fixed point numerator to generate the fixed point numerator;
        determining an absolute value of the input fixed point denominator to generate the fixed point denominator;
        determining a numerator sign of the input fixed point numerator;
        determining a denominator sign of the input fixed point denominator;
        changing a sign of the fixed point divide result, as needed, based on the numerator sign and the denominator sign to generate a signed fixed point divide result;
    using the determined fixed point divide result and signed fixed point divide result to manipulate or interpolate the image data associated with the output image; and
    displaying the output image on a display and for viewing by a user.

2. The method of claim 1, further comprising:
    clamping the signed fixed point divide result; and
    transmitting the signed fixed point divide result.

3. The method of claim 1, further comprising:
    receiving a second fixed point numerator and a second fixed point denominator, wherein the second fixed point denominator is less than the second fixed point numerator;
    detecting a leading number of zeros in the second fixed point denominator to determine a second shift value;
    shifting the second fixed point denominator by the second shift value to determine a second shifted denominator;
    determining a second fixed point denominator inverse associated with the second shifted denominator;
    performing a multiplication of the second fixed point denominator inverse and the second fixed point numerator to determine a temporary fixed point divide result; and
    shifting the temporary fixed point divide result by the second shift value to generate a second fixed point divide result for the second fixed point numerator and the second fixed point denominator.

4. The method of claim 1, further comprising:
    clamping the signed fixed point divide result;
    transmitting the signed fixed point divide result;
    receiving a second input fixed point numerator and a second input fixed point denominator, wherein the second fixed point denominator is less than the second fixed point numerator;
    determining an absolute value of the second input fixed point numerator to generate a second fixed point numerator;
    determining an absolute value of the second input fixed point denominator to generate a second fixed point denominator;
    determining a second numerator sign of the second input fixed point numerator;
    determining a second denominator sign of the second input fixed point denominator;
    detecting a leading number of zeros in the second fixed point denominator to determine a second shift value;

shifting the second fixed point denominator by the second shift value to determine a second shifted denominator;
determining a second fixed point denominator inverse associated with the second shifted denominator;
performing a multiplication of the second fixed point denominator inverse and the second fixed point numerator to determine a temporary fixed point divide result;
changing the sign of the temporary fixed point divide result, as needed, based on the numerator sign and the denominator sign to generate a signed temporary fixed point divide result;
shifting the signed temporary fixed point divide result by the second shift value to generate a second fixed point divide result for the second fixed point numerator and the second fixed point denominator, wherein shifting the signed temporary fixed point divide result is in an opposite direction of shifting the second fixed point denominator;
clamping the second signed fixed point divide result; and
transmitting the second fixed point divide result.

5. The method of claim 1, wherein determining the fixed point denominator inverse associated with the shifted denominator comprises determining the fixed point denominator inverse using a lookup table.

6. The method of claim 1, wherein determining the fixed point denominator inverse associated with the shifted denominator comprises determining the fixed point denominator inverse using a lookup table, and wherein determining the fixed point denominator inverse associated with the shifted denominator comprises an optimization associated with a predetermined precision threshold.

7. The method of claim 1, further comprising:
receiving a second fixed point numerator and a second fixed point denominator, wherein the second fixed point denominator is less than the second fixed point numerator;
detecting a leading number of zeros in the second fixed point denominator to determine a second shift value;
shifting the second fixed point denominator by the second shift value to determine a second shifted denominator;
determining a second fixed point denominator inverse associated with the second shifted denominator;
performing a multiplication of the second fixed point denominator inverse and the second fixed point numerator to determine a temporary fixed point divide result; and
shifting the temporary fixed point divide result by the second shift value to generate a second fixed point divide result for the second fixed point numerator and the second fixed point denominator,
wherein performing the multiplication of the second fixed point denominator inverse and the second fixed point numerator and performing the multiplication of the shifted fixed point denominator inverse and the shifted numerator comprises performing the multiplications via a graphics processing unit, and wherein performing the multiplication of the shifted fixed point denominator inverse and the shifted numerator comprises using fewer gates than performing the multiplication of the second fixed point denominator inverse and the second fixed point numerator.

8. The method of claim 1, further comprising:
receiving a second fixed point numerator and a second fixed point denominator, wherein the second fixed point denominator is less than the second fixed point numerator;
detecting a leading number of zeros in the second fixed point denominator to determine a second shift value;
shifting the second fixed point denominator by the second shift value to determine a second shifted denominator;
determining a second fixed point denominator inverse associated with the second shifted denominator;
performing a multiplication of the second fixed point denominator inverse and the second fixed point numerator to determine a temporary fixed point divide result; and
shifting the temporary fixed point divide result by the second shift value to generate a second fixed point divide result for the second fixed point numerator and the second fixed point denominator,
wherein performing the multiplication of the second fixed point denominator inverse and the second fixed point numerator and performing the multiplication of the shifted fixed point denominator inverse and the shifted numerator comprises performing the multiplications via a graphics processing unit, and wherein performing the multiplication of the shifted fixed point denominator inverse and the shifted numerator comprises a greater precision than performing the multiplication of the second fixed point denominator inverse and the second fixed point numerator.

9. The method of claim 1, wherein the input image comprises at least one of an image file or a video frame.

10. The method of claim 1, wherein the fixed point numerator and the fixed point denominator are associated with a block of the input image, and wherein the block comprises at least one of a single pixel or a plurality of pixels.

11. The method of claim 1, further comprising:
clamping the signed fixed point divide result;
transmitting the signed fixed point divide result;
receiving a second input fixed point numerator and a second input fixed point denominator, wherein the second input fixed point denominator is less than the second input fixed point numerator;
determining an absolute value of the second input fixed point numerator to generate a second fixed point numerator;
determining an absolute value of the second input fixed point denominator to generate a second fixed point denominator;
determining a second numerator sign of the second input fixed point numerator;
determining a second denominator sign of the second input fixed point denominator;
detecting a leading number of zeros in the second fixed point denominator to determine a second shift value;
shifting the second fixed point denominator by the second shift value to determine a second shifted denominator;
determining a second fixed point denominator inverse associated with the second shifted denominator;
performing a multiplication of the second fixed point denominator inverse and the second fixed point numerator to determine a temporary fixed point divide result;
changing a sign of the temporary fixed point divide result, as needed, based on the numerator sign and the denominator sign to generate a signed temporary fixed point divide result;
shifting the signed temporary fixed point divide result by the second shift value to generate a second fixed point divide result for the second fixed point numerator and the second fixed point denominator, wherein shifting the signed temporary fixed point divide result is in an opposite direction of shifting the second fixed point denominator; and clamping the second signed fixed point divide result;

transmitting the second fixed point divide result;

wherein determining the fixed point denominator inverse associated with the shifted denominator comprises determining the fixed point denominator inverse using a lookup table, and wherein determining the fixed point denominator inverse associated with the shifted denominator comprises an optimization associated with a predetermined precision threshold, wherein performing the multiplication of the second fixed point denominator inverse and the second fixed point numerator and performing the multiplication of the shifted fixed point denominator inverse and the shifted numerator comprises performing the multiplications via a graphics processing unit, wherein performing the multiplication of the shifted fixed point denominator inverse and the shifted numerator comprises using fewer gates than performing the multiplication of the second fixed point denominator inverse and the second fixed point numerator, and wherein performing the multiplication of the shifted fixed point denominator inverse and the shifted numerator comprises a greater precision than performing the multiplication of the second fixed point denominator inverse and the second fixed point numerator, wherein the input image comprises at least one of an image file or a video frame, wherein the fixed point numerator and the fixed point denominator are associated with a block of the input image, and wherein the block comprises at least one of a single pixel or a plurality of pixels, and wherein the fixed point numerator is at least one of 8 bits, 16 bits, 24 bits, or 32 bits.

12. A system for dividing fixed point numbers on a device, comprising:

a display device configured to present image data;

one or more processors communicatively coupled to the display device;

one or more memory stores communicatively coupled to the one or more processors;

a divide module configured to:
  receive a pixel image data fixed point numerator and a pixel image data fixed point denominator associated with an input image from the one or more memory stores, wherein the fixed point denominator is greater than the fixed point numerator;
  detect a leading number of zeros in the fixed point denominator to determine a shift value;
  shift the fixed point denominator by the shift value to determine a shifted denominator;
  shift the fixed point numerator by the shift value to determine a shifted numerator;
  determine a fixed point denominator inverse associated with the shifted denominator;
  perform a multiplication of the fixed point denominator inverse and the shifted numerator to determine a fixed point divide result for the fixed point numerator and the fixed point denominator;
  transmit the fixed point divide result to the one or more memory stores, wherein the presentment of image data via the display device is based at least in part on the determined fixed point divide result; and a second divide module configured to:
  receive a second fixed point numerator and a second fixed point denominator from the one or more memory stores, wherein the second fixed point denominator is less than the second fixed point numerator;
  detect a leading number of zeros in the second fixed point denominator to determine a second shift value;
  shift the second fixed point denominator by the second shift value to determine a second shifted denominator;
  determine a second fixed point denominator inverse associated with the second shifted denominator;
  perform a multiplication of the second fixed point denominator inverse and the second fixed point numerator to determine a temporary fixed point divide result; and
  shift the temporary fixed point divide result by the second shift value to generate a second fixed point divide result for the second fixed point numerator and the second fixed point denominator, wherein shifting the temporary fixed point divide result is in an opposite direction of shifting the second fixed point denominator.

13. The system of claim 12, wherein the divide module is further configured to:
  receive an input fixed point numerator and an input fixed point denominator associated with the input image;
  determine an absolute value of the input fixed point numerator to generate the fixed point numerator;
  determine an absolute value of the input fixed point denominator to generate the fixed point denominator;
  determine a numerator sign of the input fixed point numerator;
  determine a denominator sign of the input fixed point denominator;
  change the sign of the fixed point divide result, as needed, based on the numerator sign and the denominator sign to generate a signed fixed point divide result;
  clamp the signed fixed point divide result; and
  transmit the signed fixed point divide result.

14. The system of claim 12, further comprising:
the second divide module configured to:
  transmit the second fixed point divide result to the one or more memory stores.

15. The system of claim 12, further comprising:
the second divide module configured to:
  receive a second input fixed point numerator and a second input fixed point denominator from the one or more memory stores, wherein the second input fixed point denominator is less than the second input fixed point numerator;
  determine an absolute value of the second input fixed point numerator to generate a second fixed point numerator;
  determine an absolute value of the second input fixed point denominator to generate a second fixed point denominator;
  determine a second numerator sign of the second input fixed point numerator;
  determine a second denominator sign of the second input fixed point denominator;
  change a sign of the temporary fixed point divide result, as needed, based on the numerator sign and the denominator sign to generate a signed temporary fixed point divide result;
  clamp the second signed fixed point divide result; and transmit the second fixed point divide result to the one or more memory stores, wherein the divide module is further configured to:
receive an input fixed point numerator and an input fixed point denominator associated with the input image;
determine an absolute value of the input fixed point numerator to generate the fixed point numerator;
determine an absolute value of the input fixed point denominator to generate the fixed point denominator;
determine a numerator sign of the input fixed point numerator;
determine a denominator sign of the input fixed point denominator;
change the sign of the fixed point divide result, as needed, based on the numerator sign and the denominator sign to generate a signed fixed point divide result;
clamp the signed fixed point divide result; and
transmit the signed fixed point divide result.

16. The system of claim 12, wherein the divide module is configured to determine the fixed point denominator inverse associated with the shifted denominator using a lookup table.

17. The system of claim 12, wherein the divide module is configured to determine the fixed point denominator inverse associated with the shifted denominator using a lookup table, and wherein the fixed point denominator inverse associated with the shifted denominator comprises an optimization associated with a predetermined precision threshold.

18. The system of claim 12, wherein the divide module and the second divide module are implemented via a graphics processing unit, and wherein the multiplication of the shifted fixed point denominator inverse and the shifted numerator uses fewer gates than the multiplication of the second fixed point denominator inverse and the second fixed point numerator.

19. The system of claim 12, wherein the divide module and the second divide module are implemented via a graphics processing unit, and wherein the multiplication of the shifted fixed point denominator inverse and the shifted numerator comprises a greater precision than the multiplication of the second fixed point denominator inverse and the second fixed point numerator.

20. The system of claim 12, wherein the input image comprises at least one of an image file or a video frame.

21. The system of claim 12, wherein the fixed point numerator and the fixed point denominator are associated with a block of the input image, and wherein the block comprises at least one of a single pixel or a plurality of pixels.

22. The system of claim 12, further comprising:
a second divide module configured to:
receive a second input fixed point numerator and a second input fixed point denominator from the one or more memory stores, wherein the second input fixed point denominator is less than the second input fixed point numerator;
determine an absolute value of the second input fixed point numerator to generate a second fixed point numerator;
determine an absolute value of the second input fixed point denominator to generate a second fixed point denominator;
determine a second numerator sign of the second input fixed point numerator;
determine a second denominator sign of the second input fixed point denominator;
change a sign of the temporary fixed point divide result, as needed, based on the numerator sign and the denominator sign to generate a signed temporary fixed point divide result;
clamp the second signed fixed point divide result; and
transmit the second fixed point divide result to the one or more memory stores, wherein the divide module is further configured to:
receive an input fixed point numerator and an input fixed point denominator associated with the input image;
determine an absolute value of the input fixed point numerator to generate the fixed point numerator;
determine an absolute value of the input fixed point denominator to generate the fixed point denominator;
determine a numerator sign of the input fixed point numerator;
determine a denominator sign of the input fixed point denominator;
change the sign of the fixed point divide result, as needed, based on the numerator sign and the denominator sign to generate a signed fixed point divide result;
clamp the signed fixed point divide result;
transmit the signed fixed point divide result,
wherein the one or more processors are configured to direct the one or more memory stores to transmit and receive data from the divide module and the second divide module;
wherein the divide module is configured to determine the fixed point denominator inverse associated with the shifted denominator using a lookup table, and wherein the fixed point denominator inverse associated with the shifted denominator comprises an optimization associated with a predetermined precision threshold,
wherein the input image comprises at least one of an image file or a video frame,
wherein the fixed point numerator and the fixed point denominator are associated with a block of the input image, and wherein the block comprises at least one of a single pixel or a plurality of pixels,
wherein the fixed point numerator is at least one of 8 bits, 16 bits, 24 bits, or 32 bits, and
wherein the divide module and the second divide module are implemented via a graphics processing unit, and wherein the multiplication of the shifted fixed point denominator inverse and the shifted numerator uses fewer gates than the multiplication of the second fixed point denominator inverse and the second fixed point numerator, and wherein the multiplication of the shifted fixed point denominator inverse and the shifted numerator comprises a greater precision than the multiplication of the second fixed point denominator inverse and the second fixed point numerator.

23. At least one non-transitory machine readable medium comprising a plurality of instructions that in response to being executed on a computing device, cause the computing device to divide fixed point numbers by:
receiving, by one or more processors, a pixel image data fixed point numerator and a pixel image data fixed point denominator associated with an input image, wherein the fixed point denominator is greater than the fixed point numerator;
detecting, by one or more processors, a leading number of zeros in the fixed point denominator to determine a shift value;

shifting, by one or more processors, the fixed point denominator by the shift value to determine a shifted denominator;
shifting, by one or more processors, the fixed point numerator by the shift value to determine a shifted numerator;
determining, by one or more processors, a fixed point denominator inverse associated with the shifted denominator;
performing, by one or more processors, a multiplication of the fixed point denominator inverse and the shifted numerator to determine a fixed point divide result for the fixed point numerator and the fixed point denominator, wherein the fixed point divide result is associated with an output image; and
by one or more processors:
receiving a second fixed point numerator and a second fixed point denominator, wherein the second fixed point denominator is less than the second fixed point numerator;
detecting a leading number of zeros in the second fixed point denominator to determine a second shift value;
shifting the second fixed point denominator by the second shift value to determine a second shifted denominator;
determining a second fixed point denominator inverse associated with the second shifted denominator;
performing a multiplication of the second fixed point denominator inverse and the second fixed point numerator to determine a temporary fixed point divide result; and
shifting the temporary fixed point divide result by the second shift value to generate a second fixed point divide result for the second fixed point numerator and the second fixed point denominator;
using the determined fixed point divide result and second fixed point divide result to manipulate or interpolate the image data associated with the output image; and
displaying the output image on a display and for viewing by a user.

24. The machine readable medium of claim 23, further comprising instructions that in response to being executed on the computing device, cause the computing device to divide fixed point numbers by:
receiving an input fixed point numerator and an input fixed point denominator associated with the input image;
determining an absolute value of the input fixed point numerator to generate the fixed point numerator;
determining an absolute value of the input fixed point denominator to generate the fixed point denominator;
determining a numerator sign of the input fixed point numerator;
determining a denominator sign of the input fixed point denominator;
changing a sign of the fixed point divide result, as needed, based on the numerator sign and the denominator sign to generate a signed fixed point divide result;
clamping the signed fixed point divide result;
transmitting the signed fixed point divide result;
receiving a second input fixed point numerator and a second input fixed point denominator,
determining an absolute value of the second input fixed point numerator to generate a second fixed point numerator;
determining an absolute value of the second input fixed point denominator to generate a second fixed point denominator;
determining a second numerator sign of the second input fixed point numerator;
determining a second denominator sign of the second input fixed point denominator;
changing a sign of the temporary fixed point divide result, as needed, based on the numerator sign and the denominator sign to generate a signed temporary fixed point divide result;
wherein shifting the signed temporary fixed point divide result is in an opposite direction of shifting the second fixed point denominator; and
transmitting the second fixed point divide result;
wherein determining the fixed point denominator inverse associated with the shifted denominator comprises determining the fixed point denominator inverse using a lookup table, and wherein determining the fixed point denominator inverse associated with the shifted denominator comprises an optimization associated with a predetermined precision threshold,
wherein performing the multiplication of the second fixed point denominator inverse and the second fixed point numerator and performing the multiplication of the shifted fixed point denominator inverse and the shifted numerator comprises performing the multiplications via a graphics processing unit, wherein performing the multiplication of the shifted fixed point denominator inverse and the shifted numerator comprises using fewer gates than performing the multiplication of the second fixed point denominator inverse and the second fixed point numerator, and wherein performing the multiplication of the shifted fixed point denominator inverse and the shifted numerator comprises a greater precision than performing the multiplication of the second fixed point denominator inverse and the second fixed point numerator,
wherein the input image comprises at least one of an image file or a video frame,
wherein the fixed point numerator and the fixed point denominator are associated with a block of the input image, and wherein the block comprises at least one of a single pixel or a plurality of pixels, and
wherein the fixed point numerator is at least one of 8 bits, 16 bits, 24 bits, or 32 bits.

* * * * *